(12) United States Patent
Joetten et al.

(10) Patent No.: US 8,107,549 B2
(45) Date of Patent: Jan. 31, 2012

(54) MULTI-STAGE RECEIVER FOR WIRELESS COMMUNICATION

(75) Inventors: Christoph Arnold Joetten, Wadern (DE); George Jongren, Stockholm (SE); Ivan Jesus Fernandez-Corbaton, Nuremberg (DE)

(73) Assignee: QUALCOMM, Incorporated, San Diego, CA (US)

( * ) Notice: Subject to any disclaimer, the term of this patent is extended or adjusted under 35 U.S.C. 154(b) by 1422 days.

(21) Appl. No.: 11/564,261

(22) Filed: Nov. 28, 2006

(65) Prior Publication Data

US 2007/0195865 A1 Aug. 23, 2007

Related U.S. Application Data

(60) Provisional application No. 60/741,159, filed on Nov. 30, 2005.

(51) Int. Cl.
*H04B 7/02* (2006.01)
(52) U.S. Cl. ........ 375/267; 375/148; 375/343; 370/335; 370/342; 370/441; 370/479; 700/53
(58) Field of Classification Search .................. None
See application file for complete search history.

(56) References Cited

U.S. PATENT DOCUMENTS

| | | | |
|---|---|---|---|
| 6,301,293 B1 | 10/2001 | Huang et al. | |
| 6,801,565 B1 * | 10/2004 | Bottomley et al. | 375/148 |
| 6,990,137 B2 | 1/2006 | Smee et al. | |
| 7,039,134 B1 * | 5/2006 | Avital et al. | 375/343 |
| 7,099,299 B2 * | 8/2006 | Liang et al. | 370/342 |
| 7,170,924 B2 | 1/2007 | Corbaton et al. | |
| 7,197,282 B2 * | 3/2007 | Dent et al. | 455/67.14 |
| 7,782,987 B2 * | 8/2010 | Jonsson | 375/348 |
| 2003/0165131 A1 | 9/2003 | Liang et al. | |
| 2005/0047515 A1 | 3/2005 | Walton et al. | |
| 2005/0201499 A1 | 9/2005 | Jonsson | |

FOREIGN PATENT DOCUMENTS

| | | |
|---|---|---|
| CN | 1358355 A | 7/2002 |
| EP | 1353452 A2 | 10/2003 |
| JP | 2003503879 T | 1/2003 |
| JP | 2004222241 A | 8/2004 |
| JP | 2005065197 A | 3/2005 |

(Continued)

OTHER PUBLICATIONS

International Search Report and Written Opinion—PCT/US06/061440, International Search Authority—European Patent Office—Apr. 12, 2007.

(Continued)

*Primary Examiner* — David C. Payne
*Assistant Examiner* — Adolf Dsouza
(74) *Attorney, Agent, or Firm* — Ramin Mobarhan (57) ABSTRACT

Techniques for receiving a MIMO transmission are described. A receiver processes received data from multiple receive antennas in multiple stages. A first stage performs front-end filtering/equalization on the received data with a front-end filter to process non on-time signal components in the multiple received signals. A second stage processes the filtered data with one or more combiner matrices to combine on-time signal components for multiple transmitted signals. For a MIMO-CDM transmission, a single front-end filter may be used for all channelization codes, and a different combiner matrix may be used for each channelization code. Partitioning the receiver processing into multiple stages simplifies derivation of the front-end filter and combiner matrices while achieving good performance. The front-end filter and combiner matrices may be updated separately at the same or different rates.

24 Claims, 5 Drawing Sheets

FOREIGN PATENT DOCUMENTS

| | | | |
|---|---|---|---|
| JP | 2005260977 A | 9/2005 | |
| JP | 2005531219 | 10/2005 | |
| KR | 1020050061536 | 6/2005 | |
| RU | 2264036 | 11/2005 | |
| TW | 576029 | 2/2004 | |
| WO | WO0101594 A1 | 1/2001 | |
| WO | WO0101595 A1 | 1/2001 | |
| WO | WO02052743 A2 | 7/2002 | |
| WO | WO02080379 A2 | 10/2002 | |
| WO | WO2004075499 | 9/2004 | |
| WO | WO2004075499 A1 | 9/2004 | |
| WO | WO2005086402 A1 | 9/2005 | |
| WO | WO2005093961 A1 | 10/2005 | |
| WO | WO2005099117 | 10/2005 | |

OTHER PUBLICATIONS

Taiwanese Search report-095144483-TIPO-2010-05-19.

Translation of Office Action in Chinese application 200680044631.7 corresponding to U.S. Appl. No. 11/564,261, citing US20050201499, US20030165131 and CN1358355 dated Mar. 2, 2011.

Yamamura, T et al., "High Mobility OFDM transmission system by a new channel estimation and ISI cancellation scheme using characteristics of pilot symbol inserted OFDM signal"., Vehicular Technology Conference, vol. 1, Sep. 19, 1999-Sep. 22, 1999, pp. 319-323, XP010352958 IEEE, Piscataway, NJ, USA, ISBN: 0-7803-5435-4.

* cited by examiner

MULTI-STAGE RECEIVER FOR WIRELESS COMMUNICATION

CLAIM OF PRIORITY UNDER 35 U.S.C. §119

The present Application for Patent claims priority to Provisional Application Ser. No. 60/741,159, entitled "Bipartite Receiver Structure for MIMO CDMA Downlinks," filed Nov. 30, 2005, assigned to the assignee hereof, and expressly incorporated herein by reference.

BACKGROUND

1. Field

The present disclosure relates generally to communication, and more specifically to techniques for receiving a multiple-input multiple-output (MIMO) transmission.

2. Background

A MIMO transmission is a transmission from multiple (M) transmit antennas to multiple (N) receive antennas. For example, a transmitter may simultaneously transmit M data streams from the M transmit antennas. These data streams are distorted by the wireless environment and further degraded by noise and interference. A receiver receives the transmitted data streams via the N receive antennas. The received signal from each receive antenna contains scaled and delayed versions of the transmitted data streams. The transmitted data streams are thus dispersed among the N received signals from the N receive antennas. The receiver may then process the N received signals with a space-time equalizer to recover the transmitted data streams.

The receiver may dynamically derive coefficients for the space-time equalizer to account for variations in signal properties. These signal properties may relate to channel and interference statistics, spatio-temporal processing of the transmitted data streams, etc. The derivation of the equalizer coefficients is computationally intensive. Updating these equalizer coefficients to match the fastest changes in the signal properties may result in a very complex receiver. Updating these equalizer coefficients at a slower rate may result in performance degradation.

There is therefore a need in the art for techniques to efficiently receive a MIMO transmission.

SUMMARY

Techniques for efficiently receiving a MIMO transmission are described herein. A receiver receives multiple signals transmitted by a transmitter and processes multiple received signals to obtain received data. The receiver may process the received data in multiple stages. A first stage may perform filtering/equalization on the received data with a front-end filter to process (e.g., compensate for, suppress, or mitigate) non on-time signal components. A second stage may process filtered data from the first stage with one or more combiner matrices to combine on-time signal components. The on-time and non on-time signal components may be distinguished based on the transmit time. At the receiver, the on-time signal components may comprise signal components tracing back to a desired symbol to be recovered as well as other symbols transmitted at the same time as the desired symbol. The non on-time signal components may comprise signal components that are not on-time signal components, such as signal components tracing back to other symbols transmitted before and after the desired symbol.

The front-end filter is not dependent on data-specific processing at the transmitter whereas the combiner matrices may be functions of data-specific processing at the transmitter. The data-specific processing may correspond to, e.g., channelization codes, transmit matrices, gains, etc., used to send data. For example, in a MIMO transmission that utilizes code division multiplexing (CDM), a single front-end filter may be derived and used for all channelization codes, and a different combiner matrix may be derived for each channelization code. Partitioning the receiver processing into multiple stages simplifies the derivation of the front-end filter and the combiner matrices while achieving good performance. The front-end filter and combiner matrices may be updated separately at the same or different rates.

According to an aspect, an apparatus is described which includes at least one processor and a memory. The processor(s) filter received data to process non on-time signal components in multiple received signals and obtain filtered data. The processor(s) also process the filtered data to combine on-time signal components for multiple transmitted signals.

According to another aspect, an apparatus is described which includes at least one processor and a memory. The processor(s) derive a front-end filter for processing non on-time signal components in multiple received signals and also derive multiple combiner matrices for combining on-time signal components for multiple transmitted signals sent with multiple channelization codes. The processor(s) filter received samples with the front-end filter and obtain filtered symbols for the multiple channelization codes. The processor(s) further process the filtered symbols for each channelization code with a combiner matrix for the channelization code to obtain output symbols for the channelization code.

Various aspects and features of the disclosure are described in further detail below.

DETAILED DESCRIPTION

The receiver processing techniques described herein may be used for various communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. A CDMA system utilizes code division multiplexing (CDM) and transmits modulation symbols in parallel using different channelization codes. A CDMA system may utilize a radio technology such as Wideband-CDMA (W-CDMA), cdma2000, etc. cdma2000 covers IS-2000, IS-856, and IS-95 standards. A TDMA system may utilize a radio technology such as Global System for Mobile Communications (GSM). W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. An OFDMA system utilizes orthogonal frequency division multiplexing (OFDM) and transmits modulation symbols in the frequency domain on orthogonal subcarriers. An SC-FDMA system utilizes single-carrier frequency division multiplexing (SC-FDM) and transmits modulation symbols in the time domain on orthogonal subcarriers.

The techniques described herein may also be used for MIMO transmissions on the downlink as well as the uplink. The downlink (or forward link) refers to the communication link from base stations to wireless devices, and the uplink (or reverse link) refers to the communication link from the wireless devices to the base stations. For clarity, the techniques are described below for a MIMO transmission in a CDMA system, which may utilize W-CDMA, cdma2000, or some other CDMA radio technology.

Figure 1:
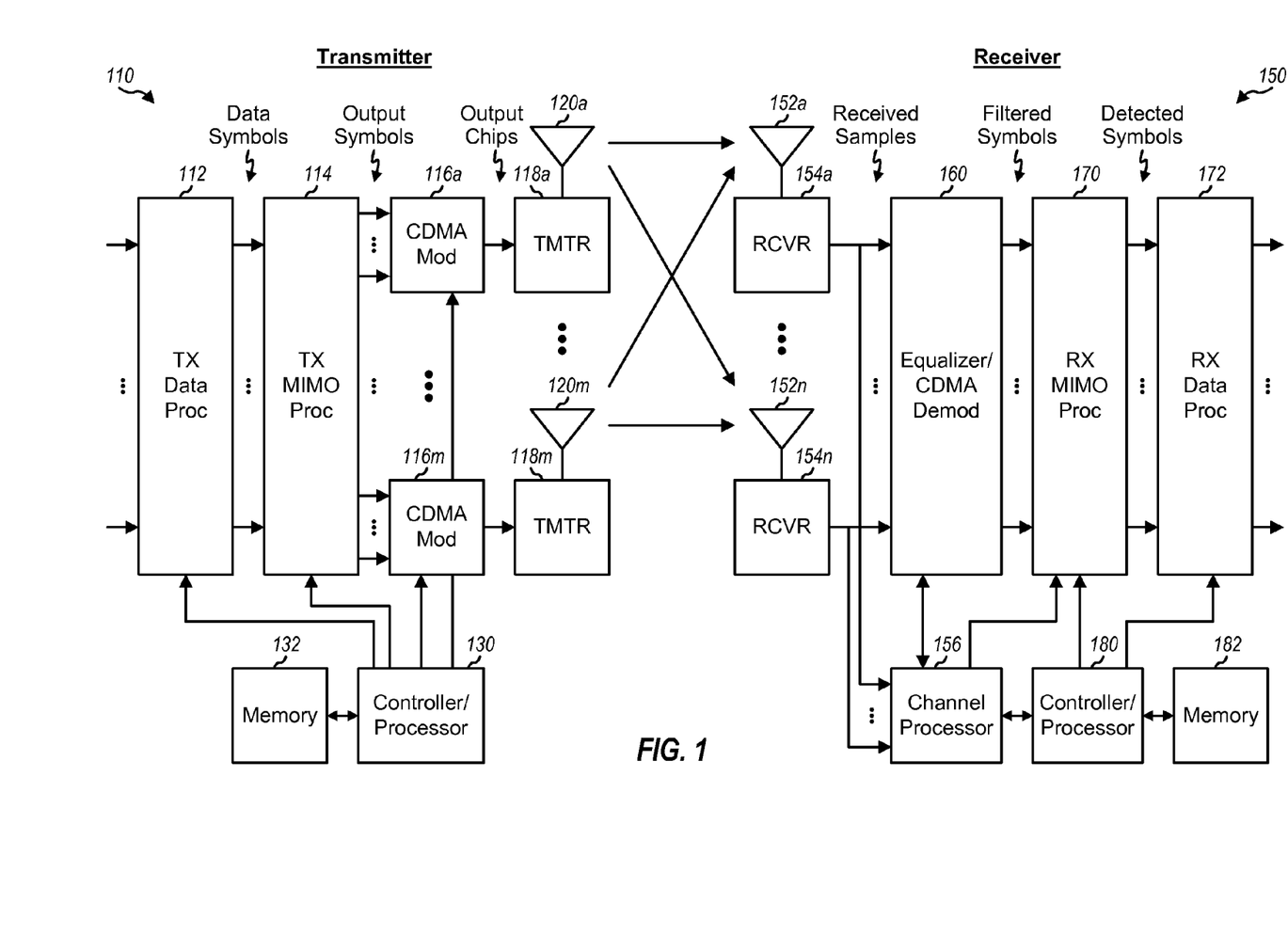
FIG. 1 shows a block diagram of a transmitter and a receiver.

FIG. 1 shows a block diagram of a transmitter 110 and a receiver 150 for a MIMO transmission. For downlink transmission, transmitter 110 is part of a base station, and receiver 150 is part of a wireless device. For uplink transmission, transmitter 110 is part of a wireless device, and receiver 150 is part of a base station. A base station is typically a fixed station that communicates with the wireless devices and may also be called a Node B, an access point, etc. A wireless device may be stationary or mobile and may also be called a user equipment (UE), a mobile station, a terminal, a station, a subscriber unit, etc. A wireless device may be a cellular phone, a personal digital assistant (PDA), a wireless modem, a laptop computer, a handheld device, etc.

At transmitter 110, a transmit data processor (TX Data Proc) 112 receives traffic data and signaling, processes (e.g., encodes, interleaves, and symbol maps) the received data, and provides data symbols. Processor 112 also generates and multiplexes pilot symbols with the data symbols. As used herein, a data symbol is a symbol for traffic data or signaling, a pilot symbol is a symbol for pilot, and a symbol is typically a complex value. The data symbols and pilot symbols may be modulation symbols from a modulation scheme such as PSK or QAM. Pilot is data that is known a priori by both the transmitter and receiver. A TX MIMO processor 114 performs spatial or spatio-temporal processing on the data and pilot symbols as described below and provides output symbols to multiple (M) CDMA modulators 116a through 116m. Each CDMA modulator 116 processes its output symbols as described below and provides output chips to an associated transmitter unit (TMTR) 118. Each transmitter unit 118 processes (e.g., converts to analog, amplifies, filters, and frequency upconverts) its output chips and generates a modulated signal. M modulated signals from M transmitter units 118a through 118m are transmitted from M antennas 120a through 120m, respectively.

At receiver 150, multiple (N) antennas 152a through 152n receive the transmitted signals via various propagation paths in the wireless environment and provide N received signals to N receiver units (RCVR) 154a through 154n, respectively. Each receiver unit 154 processes (e.g., filters, amplifies, frequency downconverts, and digitizes) its received signal and provides received samples to a channel processor 156 and an equalizer/CDMA demodulator 160. Processor 156 derives coefficients for a front-end filter/equalizer and coefficients for one or more combiner matrices as described below. Unit 160 performs equalization with the front-end filter and CDMA demodulation and provides filtered symbols. A receive (RX) MIMO processor 170 combines the filtered symbols across spatial dimension and provides detected symbols, which are estimates of the transmitted data symbols. An RX data processor 172 processes (e.g., symbol demaps, deinterleaves, and decodes) the detected symbols and provides decoded data. In general, the processing by equalizer/CDMA demodulator 160, RX MIMO processor 170, and RX data processor 172 is complementary to the processing by CDMA modulator 116, TX MIMO processor 114, and TX data processor 112, respectively, at transmitter 110.

Controllers/processors 130 and 180 direct operation of various processing units at transmitter 110 and receiver 150, respectively. Memories 132 and 182 store data and program codes for transmitter 110 and receiver 150, respectively.

Figure 2:
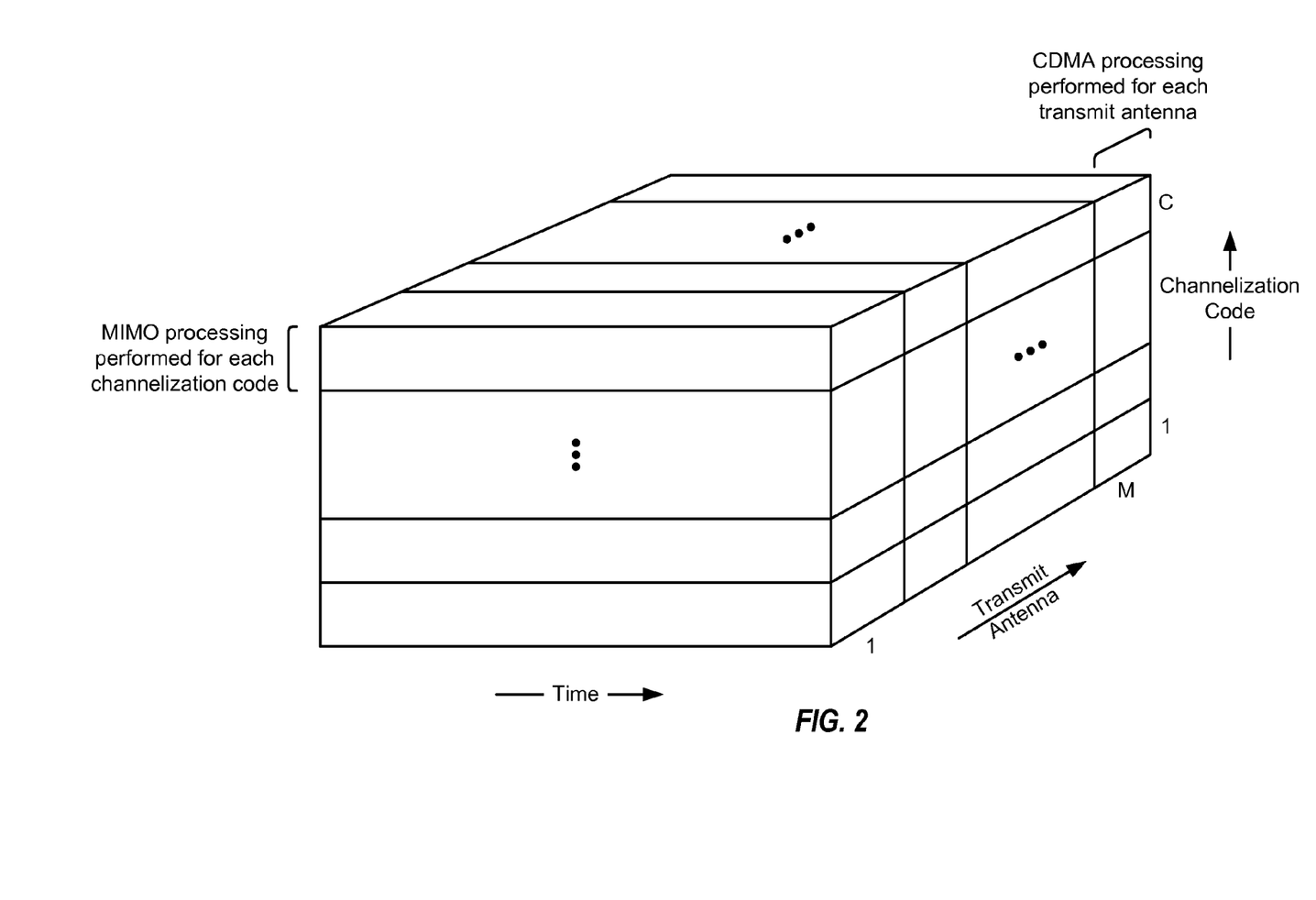
FIG. 2 illustrates a MIMO-CDM transmission.

FIG. 2 illustrates a MIMO-CDM transmission. For CDM, up to C symbols may be sent simultaneously via one transmit antenna with C channelization codes, where in general $C \geq 1$. These channelization codes may be orthogonal variable spreading factor (OVSF) codes in W-CDMA, Walsh codes in cdma2000, other orthogonal codes or quasi-orthogonal codes, pseudo-random codes, etc. Each channelization code is a specific sequence of chips. The number of chips in the sequence is the length or spreading factor of the channelization code. In general, any set of one or more channelization codes may be used for each transmit antenna, and the channelization codes may have the same or different spreading factors. For simplicity, the following description assumes that the channelization codes have the same spreading factor. The same set of C channelization codes may be reused for each of the M transmit antennas. For MIMO, up to M symbols may be sent simultaneously via M transmit antennas. For MIMO-CDM, up to C·M symbols may be sent simultaneously via M transmit antennas with C channelization codes. MIMO processing may be performed separately for each of the C channelization codes. MIMO processing is performed across all M transmit antennas for each channelization code. CDM processing may be performed separately for each of the M transmit antennas. CDM processing is performed for all C channelization codes for each transmit antenna.

Figure 3:
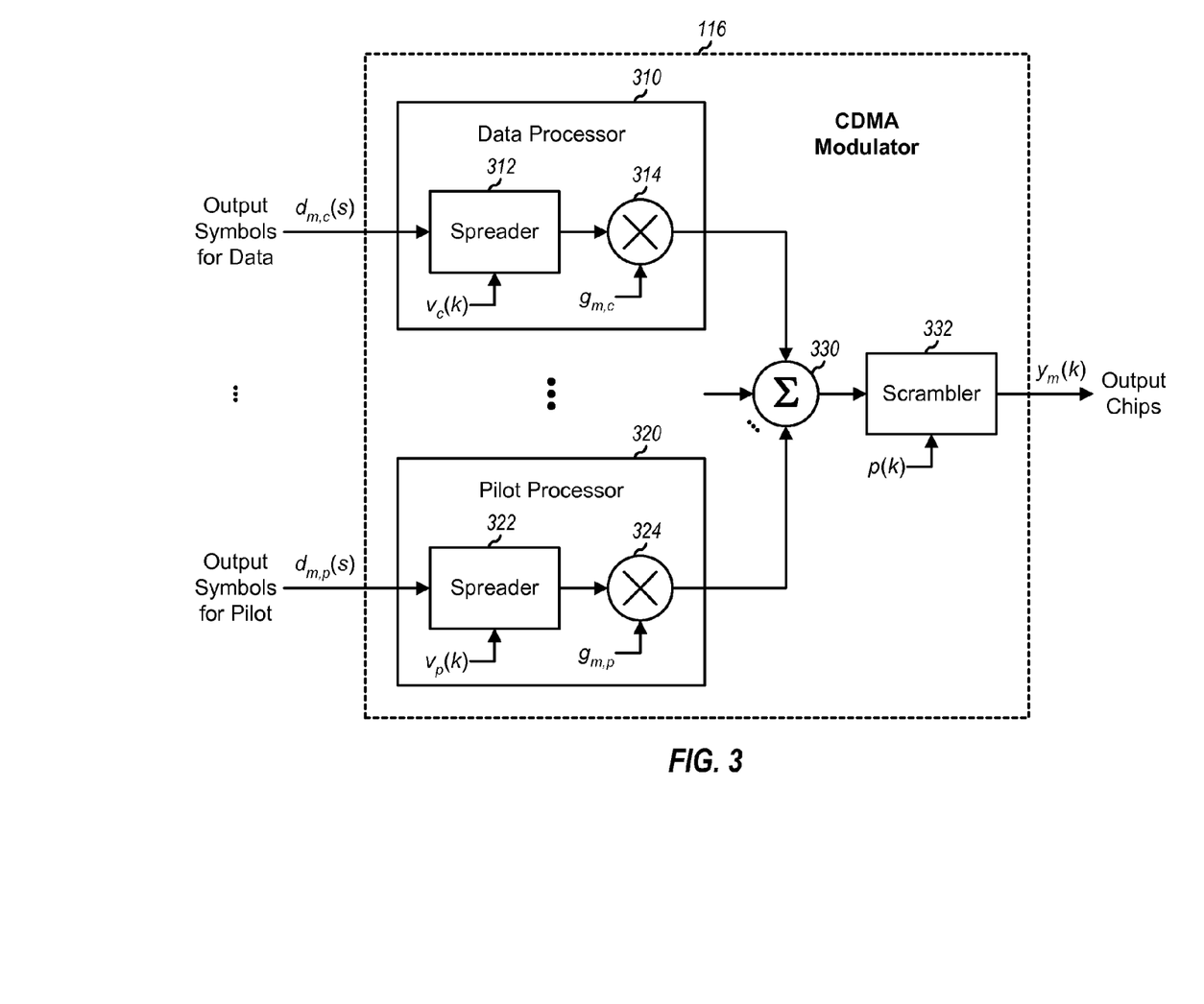
FIG. 3 shows a block diagram of a CDMA modulator.

FIG. 3 shows a block diagram of a CDMA modulator 116 for one transmit antenna m, where $m \in \{1, \ldots M\}$. CDMA modulator 116 may be used for each of CDMA modulators 116a through 116m in FIG. 1. CDMA modulator 116 includes a data processor 310 for each channelization code used for traffic data and/or signaling and a pilot processor 320 for pilot.

Within data processor 310, a spreader 312 spreads output symbols $d_{m,c}(s)$ for data with channelization code c having a chip sequence of $v_c(k)$, where s is symbol index and k is chip index. A multiplier 314 scales the output of spreader 312 with a gain $g_{m,c}$ and provides data chips for channelization code c. Within pilot processor 320, a spreader 322 spreads output symbols $d_{m,p}(s)$ for pilot with channelization code p for pilot. A multiplier 324 scales the output of spreader 322 with a gain $g_{m,p}$ and provides pilot chips. The gains $g_{m,c}$ and $g_{m,p}$ determine the amount of transmit power used for channelization code c and pilot, respectively. A summer 330 sums the data and pilot chips for all channelization codes. A scrambler 332 multiplies the output of summer 330 with a scrambling sequence p(k) for transmitter 110 and provides output chips $y_m(k)$ for transmit antenna m.

In general, any number and any ones of the C channelization codes may be used for each of the M transmit antennas. In one design, the same channelization code is used for pilot for all M transmit antennas. In another design, M channelization codes are used for pilot for the M transmit antennas, and the remaining C-M channelization codes may be reused for each of the M transmit antennas. The same scrambling sequence may be used for all M transmit antennas, as shown in FIG. 3. Alternatively, a different scrambling sequence may be used for each transmit antenna. The spreading and scrambling may also be performed in other manners.

A MIMO channel is formed by the propagation environment between the M transmit antennas at transmitter 110 and the N receive antennas at receiver 150. L data symbols may be sent in parallel from the M transmit antennas for each channelization code, where $1 \leq L \leq \min\{M, N\}$. Receiver 150 may analyze the performance (e.g., throughput) of the MIMO channel for different values of L (and possibly different transmit matrices/vectors) and may select the L value (and transmit matrix/vector) that achieves the best performance.

Transmitter 110 may perform transmitter spatial processing for each channelization code c in each symbol period s, as follows:

$$\underline{d}_c(s) = \underline{B}_c \underline{b}_c(s), \text{ for } c = 1, \ldots, C, \quad \text{Eq (1)}$$

where $\underline{b}_c(s) = [b_{1,c}(s)\ b_{2,c}(s)\ \ldots\ b_{L,c}(s)]^T$ is an L×1 vector of data symbols, $\underline{B}_c$ is an L×M transmit matrix for channelization code c, $\underline{d}_c(s) = [d_{1,c}(s)\ d_{2,c}(s)\ \ldots\ d_{M,c}(s)]^T$ is an M×1 vector of output symbols, and "$T$" denotes a transpose.

Each element of $\underline{b}_c(s)$ may correspond to a different data stream. The data streams may have different gains, in which case matrix $\underline{B}_c$ may have different column norms for different data streams. Equation (1) shows spatial encoding with $\underline{B}_c$. Spatio-temporal encoding such as, e.g., space-time transmit diversity (STTD) may also be performed but is not shown in equation (1).

Different transmit matrices may be used for different MIMO modes such as closed loop transmit diversity (CLTD), per antenna rate control (PARC), code reuse Bell Labs layered space-time (CRBLAST), double-transmit adaptive array (D-TXAA), etc. Table 1 lists some MIMO modes and, for each mode, gives L, M, $\underline{B}_c$ and the source of the data symbols. In Table 1, $\underline{B}_{cltd}$ may be a 2×1 vector selected from the set $\{[1\ e^{j\pi/4}]^T, [1\ e^{-j3\pi/4}]^T, [1\ e^{j3\pi/4}]^T, [1\ e^{-j\pi/4}]^T\}$. $\underline{B}_{d-txaa}$ may be a 2×2 matrix selected from the set $$\left\{ \begin{bmatrix} 1 & 1 \\ e^{j\pi/4} & e^{-j3\pi/4} \end{bmatrix}, \begin{bmatrix} 1 & 1 \\ e^{j3\pi/4} & e^{-j\pi/4} \end{bmatrix} \right\}.$$

I is an identity matrix with ones along the diagonal and zeros elsewhere.

TABLE 1

| MIMO Mode | L | M | $\underline{B}_c$ | Source of Data Symbols |
|---|---|---|---|---|
| CLTD | 1 | 2 | $\underline{B}_c = \underline{B}_{cltd}$ | From a single encoded frame. |
| PARC | L = M | ≥2 | $\underline{B}_c = I$ | From L different encoded frames. |
| CRBLAST | L = M | ≥2 | $\underline{B}_c = I$ | From a single encoded frame. |
| D-TXAA | L = M | =2 | $\underline{B}_c = \underline{B}_{d-txaa}$ | From up to L encoded frames. |

Transmitter 110 may perform CDMA processing for each transmit antenna m in each symbol period s, as follows:

$$y_m(k) = \left( \sum_{c=1}^{C} g_{m,c} \cdot v_c(k \bmod C) \cdot d_{m,c}(k \operatorname{div} C) \right) \cdot p(k), \quad \text{Eq (2)}$$

for $m = 1, \ldots, M$, where symbol period s corresponding to chip period k is given by $s = k \operatorname{div} C = \lfloor k/C \rfloor$. The gain $g_{m,c}$ may be set equal to zero for each channelization code that is not used.

If channelization codes with different spreading factors are used, then the CDMA processing for transmit antenna m may be expressed as:

$$y_m(k) = \left( \sum_{c=1}^{N_{pc}} g_{m,c} \cdot v_c(k \bmod C_c) \cdot d_{m,c}(k \operatorname{div} C_c) \right) \cdot p(k),$$

where $C_c$ is the spreading factor of channelization code c, and $N_{pc}$ is the number of channelization codes used for transmit antenna m.

For simplicity, the following description assumes that channelization codes with spreading factor of C is used for each transmit antenna. In equation (2), output symbol $d_{m,c}(s)$ is spread with channelization code c with spreading factor C and scaled by gain $g_{m,c}$ to obtain data chips. The spreading is achieved by replicating output symbol $d_{m,c}(s)$ a number of C times and multiplying the C output symbol copies with the $C^{(c)}$ chips $v_c(k)$ of channelization code c. The data and pilot chips for all C channelization codes are summed and further scrambled with scrambling sequence p(k) to obtain output chips $y_m(k)$ for transmit antenna m. The same CDMA processing is performed for each of the M transmit antennas.

The received samples at receiver 150 in each chip period k may be expressed as:

$$\underline{x}(k) = \underline{H}\underline{y}(k) + \underline{n}(k), \quad \text{Eq (3)}$$

where $\underline{y}(k)$ is a T×1 vector of output chips, where T is described below, H is an R×T channel response matrix, where R is described below, $\underline{x}(k)$ is an R×1 vector of received samples, and $\underline{n}(k)$ is an R×1 noise vector.

Receiver 150 may digitize the received signal from each receive antenna at K times the chip rate, where K is an oversampling ratio and in general $K \geq 1$. In each chip period k, receiver 150 may obtain E·K samples from each receiver 154 and form $\underline{x}(k)$ by stacking N·E·K samples from N receivers 154a through 154n. E is the length of the front-end equalizer at receiver 150, in number of chips. In general, $E \geq 1$ and may be selected based on a tradeoff between receiver complexity and performance. $\underline{x}(k)$ includes R received samples from N receive antennas for E chip periods, where $R = N \cdot E \cdot K$.

Matrix H contains time-domain channel impulse responses for all transmit and receive antenna pairs. As shown in FIG. 1, there is a propagation channel between each transmit antenna and each receive antenna, or a total of M·N propagation channels between the M transmit antennas and N receive antennas. Each propagation channel has a particular impulse response determined by the wireless environment. The response of a single-input multiple-output (SIMO) channel between each transmit antenna m and the N receive antennas may be given by an $R \times T_m$ submatrix $\underline{H}_m$. The number of rows in $\underline{H}_m$ is determined by the number of entries in $\underline{x}(k)$. The number of columns in $\underline{H}_m$ is determined by the equalizer length E as well as the time span of the impulse responses between transmit antenna m and the N receive antennas. $T_m$ may be given as follows:

$$T_m = \lceil E + \max_n \{\ell_{m,n}\} \rceil, \quad \text{Eq (4)}$$

where $l_{m,n}$ is the time span of the impulse response between transmit antenna m and receive antenna n, in number of chips.

Matrix H is composed of M submatrices $\underline{H}_m$, for m=1, ... M, as follows:

$$\underline{H} = [\underline{H}_1 \, \underline{H}_2 \ldots \underline{H}_M]. \quad \text{Eq (5)}$$

$\underline{H}$ has a dimension of R×T, where $T = T_1 + T_2 + \ldots + T_M$.

Vector $\underline{y}(k)$ is composed of M subvectors $\underline{y}_m(k)$, for m=1, ..., M, for the M transmit antennas. Each subvector $\underline{y}_m(k)$ includes $T_m$ output chips from one transmit antenna m centered at chip period k. Vector $\underline{y}(k)$ and subvector $\underline{y}_m(k)$ may be expressed as:

$$\underline{y}(k) = \begin{bmatrix} \underline{y}_1(k) \\ \underline{y}_2(k) \\ \vdots \\ \underline{y}_M(k) \end{bmatrix} \quad \text{Eq (6)}$$

and $$\underline{y}_m(k) = \begin{bmatrix} y_m(k - \lfloor T_m/2 - 1 \rfloor) \\ \vdots \\ y_m(k) \\ \vdots \\ y_m(k + \lceil T_m/2 - 1 \rceil) \end{bmatrix}.$$

Equation (3) may also be expressed as:

$$\underline{x}(k) = \sum_{m=1}^{M} \underline{H}_m \underline{y}_m(k) + \underline{n}(k). \quad \text{Eq (7)}$$

For the model shown in equation (7), in each chip period k, $T_m$ output chips are sent from each transmit antenna m and via a SIMO channel with a response of $\underline{H}_m$ to the N receive antennas. The received samples in x(k) include contributions from all M transmit antennas. $\underline{x}(k)$, $\underline{y}(k)$, and $\underline{H}$ may be relatively large. As an example, with M=2, N=2, K=2, E=20, T=48, and R=80, $\underline{y}(k)$ would be a 48×1 vector, $\underline{H}$ would be an 80×48 matrix, and $\underline{x}(k)$ would be an 80×1 vector.

The noise may be assumed to be stationary complex random vector with $$E\{\underline{n}(k)\} = \underline{0}, \text{ and} \quad \text{Eq (8)}$$

$$E\{\underline{n}(k)\underline{n}^H(k)\} = \underline{R}_{nn}, \quad \text{Eq (9)}$$

where E{ } is an expectation operation, 0 is a vector of all zeros, $\underline{R}_{nn}$ is an R×R noise covariance matrix, and "H" denotes a conjugate transpose. Equations (8) and (9) indicate that the noise has zero mean and a covariance matrix of $\underline{R}_{nn}$.

Receiver 150 may recover the data symbols in $\underline{b}_c(s)$ for each channelization code c by filtering the received samples in x(k) with a bank of L filters for channelization code c and then despreading and descrambling the filtered samples, as follows:

$$\hat{\underline{b}}_c(s) = \frac{1}{\sqrt{C}} \cdot \sum_{k=sC}^{(s+1)C-1} \underline{W}_c^H \underline{x}(k) \cdot [v_c(k \bmod C) \cdot p(k)]^* \quad \text{Eq (10)}$$

$$= \underline{W}_c^H \left( \frac{1}{\sqrt{C}} \cdot \sum_{k=sC}^{(s+1)C-1} [\underline{H}\underline{y}(k) + \underline{n}(k)] \cdot [v_c(k \bmod C) \cdot p(k)]^* \right)$$

$$= \underline{W}_c^H [\underline{H}\Theta_c(s) + \underline{n}_c(s)]$$

$$= \underline{W}_c^H \underline{\chi}_c(s)$$

where $$\Theta_c(s) = \left( \frac{1}{\sqrt{C}} \cdot \sum_{k=sC}^{(s+1)C-1} \underline{y}(k) \cdot [v_c(k \bmod C) \cdot p(k)]^* \right), \quad \text{Eq (11)}$$

$$\underline{n}_c(s) = \left( \frac{1}{\sqrt{C}} \cdot \sum_{k=sC}^{(s+1)C-1} \underline{n}(k) \cdot [v_c(k \bmod C) \cdot p(k)]^* \right), \quad \text{Eq (12)}$$

$$\underline{\chi}_c(s) = \left( \frac{1}{\sqrt{C}} \cdot \sum_{k=sC}^{(s+1)C-1} \underline{x}(k) \cdot [v_c(k \bmod C) \cdot p(k)]^* \right) \quad \text{Eq (13)}$$

$$= \underline{H}\Theta_c(s) + \underline{n}_c(s),$$

$\underline{W}_c$ is an L×R overall filter for channelization code c,
$\hat{\underline{b}}_c(s)$ is an estimate of $\underline{b}_c(s)$, and
"*" denotes a complex conjugate.

$\Theta_c(s)$ is a T×1 vector of despread symbols for channelization code c and is obtained based on the transmitted chips. $\underline{n}_c(s)$ is an R×1 noise vector for channelization code c after descrambling and despreading. $\underline{n}_c(s)$ conserves the statistics of n(k), which are independent of channelization code c. $\underline{\chi}_c(s)$ is an R×1 vector of despread symbols for channelization code c and is obtained based on the received samples. $\underline{W}_c$ includes the bank of L filters for channelization code c. Equation (10) indicates that the processing with $\underline{W}_c$ may equivalently be performed on the symbols in $\underline{\chi}_c(s)$ instead of the received samples in x(k).

Filter $\underline{W}_c$ may be a Weiner filter, which may be derived as:

$$\underline{W}_c = E\{\underline{\chi}_c(s)\underline{\chi}_c^H(s)\}^{-1} \cdot E\{\underline{\chi}_c(s)\underline{b}_c^H(s)\} \quad \text{Eq (14)}$$

$$= [\underline{H}E\{\Theta_c(s)\Theta_c^H(s)\}\underline{H}^H + \underline{R}_{nn}]^{-1} \cdot [\underline{H}E\{\Theta_c(s)\underline{b}_c^H(s)\}]$$

$$= [\underline{H}\Gamma_c\underline{H}^H + \underline{R}_{nn}]^{-1} \underline{H}\underline{\gamma}_c$$

$$= \underline{R}_c^{-1}\underline{H}\underline{\gamma}_c$$

$$= \underline{R}_c^{-1}\Phi_c$$

where $$\Gamma_c = E\{\Theta_c(s)\Theta_c^H(s)\}, \quad \text{Eq (15)}$$

$$\underline{\gamma}_c = E\{\Theta_c(s)\underline{b}_c^H(s)\}, \text{ and} \quad \text{Eq (16)}$$

$$\underline{R}_c = \underline{H}\Gamma_c\underline{H}^H + \underline{R}_{nn}. \quad \text{Eq (17)}$$

$\Gamma_c$ is a T×T covariance matrix of $\Theta_c(s)$. $\underline{\gamma}_c$ is a T×L correlation matrix of $\Theta_c(s)$ and $\underline{b}_c(s)$ and is indicative of the transmitted signal characteristic. $\underline{R}_c$ is an R×R correlation matrix for the wireless channel, signal, and noise statistics. Matrices $\Gamma_c$, $\underline{\gamma}_c$, and $\underline{R}_c$ are dependent on channelization code c through transmit matrix $\underline{B}_c$ and gain $g_{m,c}$.

Matrix $\Gamma_c$ may be expressed as:

$$\Gamma_c = \tilde{\Gamma} + \underline{\gamma}_c \underline{\gamma}_c^H, \quad \text{Eq (18)}$$

where $\tilde{\Gamma}$ is a part of $\Gamma_c$ that is not dependent on channelization code c. It can be shown that only M elements of $\underline{\gamma}_c$ are non-zero. The indices of the non-zero elements of $\underline{\gamma}_c$ are such that the R×L matrix $\underline{\Phi}_c$ may be expressed as:

$$\underline{H}\underline{\gamma}_c = \underline{\Phi}_c = \underline{\tilde{H}}\,\underline{G}_c\,\underline{B}_c, \qquad \text{Eq (19)}$$

where $\tilde{H}$ is an R×M matrix containing M "on-time" columns of H, and $\underline{\bar{G}}_c$ is an M×M diagonal matrix containing $\sqrt{C} \cdot g_{m,c}$, for m=1, ..., M, along the diagonal and zeros elsewhere.

As shown in equation (5), $\underline{H}$ contains $T=T_1+T_2+\ldots+T_M$ columns for the M transmit antennas. $\tilde{H}$ contains M columns of $\underline{H}$, or one column for each transmit antenna. The M columns of $\tilde{H}$ multiply the M elements in $\underline{y}(k)$ that have their chip time aligned with the despreader operation in equation (10). These M columns may be identified as described below.

Matrix $\underline{R}_c$ in equation (17) may then be expressed as:

$$\underline{R}_c = \underline{H}\underline{\Gamma}_c\underline{H}^H + \underline{R}_{nn} \qquad \text{Eq (20)}$$
$$= \underline{H}\underline{\hat{\Gamma}}\underline{H}^H + \underline{R}_{nn} + \underline{H}\underline{\gamma}_c\underline{\gamma}_c^H\underline{H}^H$$
$$= \underline{\tilde{R}} + \underline{\Phi}_c\underline{\Phi}_c^H$$

where $$\underline{\tilde{R}} = \underline{H}\underline{\hat{\Gamma}}\underline{H}^H + \underline{R}_{nn}. \qquad \text{Eq (21)}$$

Matrix $\underline{W}_c$ in equation (14) may then be expressed as:

$$\underline{W}_c = \underline{R}_c^{-1}\underline{\tilde{H}}\underline{G}_c\underline{B}_c \qquad \text{Eq (22)}$$
$$= [\underline{\tilde{R}} + \underline{\Phi}_c\underline{\Phi}_c^H]^{-1}\underline{\tilde{H}}\underline{G}_c\underline{B}_c$$
$$= \underline{\tilde{R}}^{-1}\underline{\tilde{H}}\underline{G}_c\underline{B}_c\left(I + \underline{B}_c^H\underline{G}_c^H\underline{\tilde{H}}^H\underline{\tilde{R}}^{-1}\underline{\tilde{H}}\underline{G}_c\underline{B}_c\right)^{-1}$$
$$= \underline{F}\underline{\Delta}_c$$

where $$\underline{F} = \underline{\tilde{R}}^{-1}\underline{\tilde{H}}, \text{ and} \qquad \text{Eq (23)}$$

$$\underline{\Delta}_c = \underline{G}_c\underline{B}_c\left(I + \underline{B}_c^H\underline{G}_c^H\underline{\tilde{H}}^H\underline{\tilde{R}}^{-1}\underline{\tilde{H}}\underline{G}_c\underline{B}_c\right)^{-1}. \qquad \text{Eq (24)}$$

In equation (23), F is a relatively large R×M matrix that is not dependent on channelization code. In equation (24), $\underline{\Delta}_c$ is a small M×L matrix that contains all of the code dependent matrices in $\underline{W}_c$.

Equations (10) through (24) indicate that the processing at receiver 150 may be performed in two stages. The first stage filters the received samples x(k) with a front-end filter F that is not dependent on channelization code and further despreads and descrambles the filtered samples to obtain filtered symbols. A single front-end filter may be used for all channelization codes. The second stage combines the filtered symbols with a combiner matrix $\underline{\Delta}_c$ for each channelization code c to obtain detected symbols for that channelization code. The front-end filter and combiner matrices may be updated separately at the same rate or different rates.

The multi-stage receiver processing may be performed in various manners. In the following description, pilot symbols are assumed to be sent with a transmit matrix of $\underline{B}_c = I$ and using the same channelization code p for each of the M transmit antennas. The pilot symbols are also assumed to be uncorrelated or orthogonal so that $E\{\underline{b}_p(s)\underline{b}_p^H(s)\}=I$, where $\underline{b}_p(s)$ is an M×1 vector of pilot symbols sent from the M transmit antennas in symbol period s.

In one receiver design, front-end filter F is derived and used for the first stage (e.g., for block 160 in FIG. 1), and combiner matrix $\underline{\Delta}_c$ is computed for each channelization code and used for the second stage (e.g., for block 170 in FIG. 1).

For symbol level training, a filter may be derived based on pilot symbols using least squares criterion, as follows:

$$\underline{W}_p = \min_{\underline{W}_h} \sum_{s=s_0}^{s_0+P-1} \left\| \underline{W}_h^H\underline{\chi}_p(s) - \underline{b}_p(s) \right\|^2, \qquad \text{Eq (25)}$$

where $\underline{\chi}_p(s)$ is an R×1 vector of despread pilot symbols,
$\underline{W}_h$ is an R×M candidate filter matrix,
$\underline{W}_p$ is an R×M filter matrix derived based on pilot symbols, and
P is the number pilot symbols used to derive $\underline{W}_p$.

The despread pilot symbols in $\underline{\chi}_p(s)$ may be obtained as shown in equation (13), albeit with pilot channelization code p instead of channelization code c. The least squares criterion selects a candidate filter matrix from among all candidate filter matrices such that the quantity on the right hand side is minimized. The selected filter matrix is provided as the least squares filter matrix $\underline{W}_p$.

In the limit, with $P \to \infty$ in equation (25), $\underline{W}_p$ may be expressed as:

$$\underline{W}_p = [E\{\underline{\chi}_p(s)\underline{\chi}_p^H(s)\}]^{-1} E\{\underline{\chi}_p(s)\underline{b}_p^H(s)\}. \qquad \text{Eq (26)}$$

For symbol level training, $\underline{W}_p$ may be derived as follows. Despread pilot symbols in $\underline{\chi}_p(s)$ may be obtained from the received samples as shown in equation (13). An R×R outer product $\underline{\chi}_p(s)\underline{\chi}_p^H(s)$ may be computed and averaged over a sufficient number of pilot symbols. An R×M outer product $\underline{\chi}_p(s)\underline{b}_p^H(s)$ may also be computed and averaged. $\underline{W}_p$ may be computed based on the two averaged outer products. $\underline{W}_p$ may also be derived based on recursive least squares (RLS), block least squares, or some other techniques known in the art.

For chip level training, a filter may be derived based on received samples using the least squares criterion, as follows:

$$\underline{W}_p = \min_{\underline{W}_h} \sum_{k=s_0 C}^{(s_0+P)C-1} \left\| \underline{W}_h^H\underline{x}(k) - \underline{b}_p(s) \cdot v_p(k \bmod C) \cdot p(k) \right\|^2, \qquad \text{Eq (27)}$$

where $\underline{b}_p(s) \cdot v_p(k) \cdot p(k)$ is an M×1 vector of pilot chips obtained by spreading and scrambling the pilot symbols.

In the limit, with $P \to \infty$ in equation (27), $\underline{W}_p$ may be expressed as:

$$\underline{W}_p = [E\{\underline{x}(k)\underline{x}^H(k)\}]^{-1} E\{\underline{x}(k)\underline{b}_p^H(s) \cdot v_p(k) \cdot p(k)\} \qquad \text{Eq (28)}$$

For chip level training, $\underline{W}_p$ may be derived as follows. An R×R outer product $\underline{x}(k)\underline{x}^H(k)$ may be computed based on the received samples and averaged over a sufficient number of pilot symbols. An R×M outer product $\underline{x}(k)\underline{b}_p^H(s) \cdot v_p(k) \cdot p(k)$ may also be computed and averaged. $\underline{W}_p$ may then be computed based on the two averaged outer products.

From equation (22), $\underline{W}_p$ may be expressed as:

$$\underline{W}_p = \underline{\tilde{R}}^{-1}\underline{\tilde{H}}\underline{G}_p\left(I + \underline{G}_p\underline{\tilde{H}}^H\underline{\tilde{R}}^{-1}\underline{\tilde{H}}\underline{G}_p\right)^{-1} \qquad \text{Eq (29)}$$
$$= \underline{F}\,\underline{G}_p\left(I + \underline{P}_p\right)^{-1}$$

where $\underline{P}_p = \underline{G}_p\underline{\tilde{H}}^H\underline{\tilde{R}}^{-1}\underline{\tilde{H}}\underline{G}_p$. $\qquad \text{Eq (30)}$ The M×M matrix $\underline{P}_p$ may be estimated as follows:

$$\underline{P}_p = \frac{1}{P} \cdot \sum_{s=s_0}^{s_0+P-1} \underline{F}_p^H \underline{\chi}_p(s) \underline{b}_p^H(s). \qquad \text{Eq (31)}$$

The estimate of $\underline{P}_p$ becomes more accurate in the limit, with $P \to \infty$. Similar to $\underline{W}_p$, $\underline{P}_p$ may also be estimated based on pilot chips instead of pilot symbols.

Front-end filter F may be derived based on equation (29), as follows:

$$\underline{F} = \underline{W}_p (I + \underline{P}_p) \underline{G}_p^{-1}. \qquad \text{Eq (32)}$$

Combiner matrix $\underline{\Delta}_c$ may be derived based on equations (24) and (30), as follows:

$$\underline{\Delta}_c = \underline{G}_c \underline{B}_c (I + \underline{B}_c^H \underline{G}_c \underline{G}_p^{-1} \underline{P}_p \underline{G}_p^{-1} \underline{G}_c \underline{B}_c)^{-1}. \qquad \text{Eq (33)}$$

Filter $\underline{W}_c$ may be expressed based on $\underline{W}_p$ and $\underline{P}_p$, as follows:

$$\begin{aligned}\underline{W}_c &= \underline{F}\underline{G}_c\underline{B}_c \left(I + \underline{B}_c^H \underline{G}_c \tilde{\underline{H}}^H \tilde{\underline{R}}^{-1} \tilde{\underline{H}} \underline{G}_c \underline{B}_c\right)^{-1} \\ &= \underline{W}_p (I + \underline{P}_p) \underline{G}_p^{-1} \underline{G}_c \underline{B}_c (I + \underline{B}_c^H \underline{G}_c \underline{G}_p^{-1} \underline{P}_p \underline{G}_p^{-1} \underline{G}_c \underline{B}_c)^{-1}.\end{aligned} \qquad \text{Eq (34)}$$

As shown in equation (32), front-end filter F may be derived based on $\underline{W}_p$ and $\underline{P}_p$, which may in turn be estimated based on pilot symbols or chips. As shown in equation (33), combiner matrix $\underline{\Delta}_c$ for each channelization code c may be derived based on $\underline{P}_p$, gain matrices $\underline{G}_p$ and $\underline{G}_c$ for pilot and data, and transmit matrix $\underline{B}_c$ for channelization code c. $\underline{G}_c \underline{G}_p^{-1}$ is also referred to as a traffic-to-pilot ratio and may be known (e.g., via signaling) or estimated by the receiver. It is normally sufficient to estimate the traffic-to-pilot ratio $\underline{G}_c \underline{G}_p^{-1}$, and $\underline{G}_p$ and $\underline{G}_c$ do not need to be estimated separately.

Receiver 150 may recover the data symbols in $\underline{b}_c(s)$ as follows:

$$\hat{\underline{b}}_c(s) = \underline{\Delta}_c^H \left( \frac{1}{\sqrt{C}} \cdot \sum_{k=sC}^{(s+1)C-1} \underline{F}^H \underline{x}(k) \cdot [v_c(k \bmod C) \cdot p(k)]^* \right). \qquad \text{Eq (35)}$$

Receiver 150 may perform the processing for equation (35) in two stages. In the first part of the first stage, receiver 150 may perform front-end filtering in each chip period k, as follows:

$$\underline{v}(k) = \underline{F}^H \underline{x}(k), \qquad \text{Eq (36)}$$

where v(k) is an M×1 vector of filtered samples.

In the second part of the first stage, receiver 150 may despread and descramble the filtered samples for each channelization code c, as follows:

$$\hat{\underline{d}}_c(s) = \frac{1}{\sqrt{C}} \cdot \sum_{k=sC}^{(s+1)C-1} \underline{v}(k) \cdot [v_c(k \bmod C) \cdot p(k)]^*, \qquad \text{Eq (37)}$$

where $\hat{\underline{d}}_c(s)$ an M×1 vector of filtered symbols, which is an estimate of $\underline{d}_c(s)$.

In the second stage, receiver 150 may perform combining for each channelization code c, as follows:

$$\hat{\underline{b}}_c(s) = \underline{\Delta}_c^H \hat{\underline{d}}_c(s) \qquad \text{Eq (38)}$$

Receiver 150 may also recover the data symbols in $\underline{b}_c(s)$ as follows:

$$\hat{\underline{b}}_c(s) = \underline{\Delta}_c^H \underline{F}^H \frac{1}{\sqrt{C}} \cdot \sum_{k=sC}^{(s+1)C-1} \underline{x}(k) \cdot [v_c(k \bmod C) \cdot p(k)]^*. \qquad \text{Eq (39)}$$

Equation (39) may also be performed in two stages. In the first part of the first stage, receiver 150 may despread and descramble the received samples for each channelization code c to obtain despread symbols for that channelization code. In the second part of the first stage, receiver 150 may perform filtering on the despread symbols for each channelization code c with the same front-end filter F to obtain filtered symbols for that channelization code. In the second stage, receiver 150 may combine the filtered symbols for each channelization code c with the combiner matrix $\underline{\Delta}_c$ for that channelization code.

$\underline{W}_p$ is obtained based on pilot symbols or chips and may not have converged to the optimal settings, e.g., because a finite number of pilot symbols (P) is used for training. In such instances, using F and $\underline{\Delta}_c$ derived based on $\underline{W}_p$ may result in performance degradation.

In another receiver design, $\underline{W}_p$ is used as the front-end filter for the first stage. A combiner matrix $\underline{D}_c$ is computed for each channelization code c and used for the second stage.

The filtered symbols obtained with $\underline{W}_p$ may be expressed as:

$$\begin{aligned}\underline{z}_c(s) &= \underline{W}_p^H \underline{\chi}_c(s) \\ &= \underline{W}_p^H \tilde{\underline{H}} \underline{G}_c \underline{B}_c \underline{b}_c(s) + \underline{n}_c(s) \\ &= \underline{A}_c \underline{b}_c(s) + \underline{n}_c(s)\end{aligned} \qquad \text{Eq (40)}$$

where $\underline{A}_c = \underline{W}_p^H \tilde{\underline{H}} \underline{G}_c \underline{B}_c$, and $\qquad \text{Eq (41)}$ $\underline{z}_c(s)$ is an M×1 vector of filtered symbols for channelization code c.

The data symbols in $\underline{b}_c(s)$ may be obtained as:

$$\hat{\underline{b}}_c(s) = \underline{D}_c^H \underline{z}_c(s) \qquad \text{Eq (42)}$$

where $\underline{D}_c$ is an M×L combiner matrix for channelization code c.

Combiner matrix $\underline{D}_c$ may be derived based on minimum mean square error (MMSE) criterion, as follows:

$$\underline{D}_c = (\underline{A}_c \underline{A}_c^H + \underline{R}_{nn,c})^{-1} \underline{A}_c. \qquad \text{Eq (43)}$$

The noise covariance matrix $\underline{R}_{nn,c}$ may be estimated as follows:

$$\begin{aligned}\underline{R}_{nn,c} &= \frac{1}{P} \cdot \sum_{s=s_0 C}^{s_0+P-1} [\underline{z}_p(s) - \underline{A}_p(s)\underline{b}_p(s)][\underline{z}_p(s) - \underline{A}_p(s)\underline{b}_p(s)]^H \\ &= \frac{1}{P} \cdot \sum_{s=s_0}^{s_0+P-1} \underline{z}_p(s)\underline{z}_p^H(s) - \underline{P}_p \underline{P}_p^H,\end{aligned} \qquad \text{Eq (44)}$$

where $\underline{A}_p = \underline{W}_p^H \tilde{\underline{H}} \underline{G}_p$. The second equality in equation (44) results from the fact that an unbiased estimate of $\underline{A}_p$ is simply $\underline{A}_p = \underline{P}_p$.

The M×L matrix $\underline{A}_c$ may be expressed as:

$$\underline{A}_c = \underline{A}_p \underline{G}_p^{-1} \underline{G}_c \underline{B}_c. \qquad \text{Eq (45)}$$

As shown in equation (45), matrix $\underline{A}_c$ may be computed for each channelization code c based on (a) matrix $\underline{P}_p$ estimated from pilot symbols or chips and applicable for all channelization codes and (b) traffic-to-pilot ratio $G_p^{-1}G_c$ and transmit matrix $\underline{B}_c$ that are specific for channelization code c. As shown in equation (43), combiner matrix $\underline{D}_c$ may be computed for each channelization code c based on (a) noise covariance matrix $R_{nn,c}$ that is applicable for all channelization codes and (b) matrix $\underline{A}_c$ computed for channelization code c.

Combiner matrix $\underline{D}_c$ may also be estimated for each channelization code c as follows:

$$\underline{R}_{zz} = E\left\{\frac{1}{C} \cdot \sum_{c=1}^{C} \underline{z}_c(s)\underline{z}_c^H(s)\right\}, \text{ and} \quad \text{Eq (46)}$$

$$\underline{D}_c = \underline{R}_{zz}^{-1}\underline{A}_c, \quad \text{Eq (47)}$$

where $\underline{R}_{zz}$ is an M×M covariance matrix for $\underline{z}_c(s)$.

In equation (46), an outer product $\underline{z}_c(s)\underline{z}_c^H(s)$ may be computed for each channelization code, then averaged over all channelization codes with the same transmit matrix $\underline{B}_c$, and further averaged over a sufficient number of symbol periods to obtain covariance matrix $\underline{R}_{zz}$. $\underline{D}_c$ may then be computed based on $\underline{A}_c$ and the inverse of $\underline{R}_{zz}$.

Receiver 150 may recover the data symbols in $\underline{b}_c(s)$ as follows:

$$\hat{\underline{b}}_c(s) = \underline{D}_c^H\left(\frac{1}{\sqrt{C}} \cdot \sum_{k=sC}^{(s+1)C-1} \underline{W}_p^H\underline{x}(k) \cdot [v_c(k\bmod C) \cdot p(k)]^*\right). \quad \text{Eq (48)}$$

In equation (48), receiver 150 may filter the received samples with front-end filter $\underline{W}_p$, then despread and descramble the filtered samples for each channelization code c, and then combine the filtered symbols for each channelization code with combiner matrix $\underline{D}_c$.

Receiver 150 may also recover the data symbols in $\underline{b}_c(s)$ as follows:

$$\hat{\underline{b}}_c(s) = \underline{D}_c^H \underline{W}_p^H \frac{1}{\sqrt{C}} \cdot \sum_{k=sC}^{(s+1)C-1} \underline{x}(k) \cdot [v_c(k\bmod C) \cdot p(k)]^*. \quad \text{Eq (49)}$$

In equation (49), receiver 150 may despread and descramble the received samples for each channelization code c, then filter the despread symbols for each channelization code with front-end filter $\underline{W}_p$, and then combine the filtered symbols for each channelization code with combiner matrix $\underline{D}_c$.

The receiver processing may also be performed in multiple stages in other manners. A specific receiver design is described below.

Figure 4:
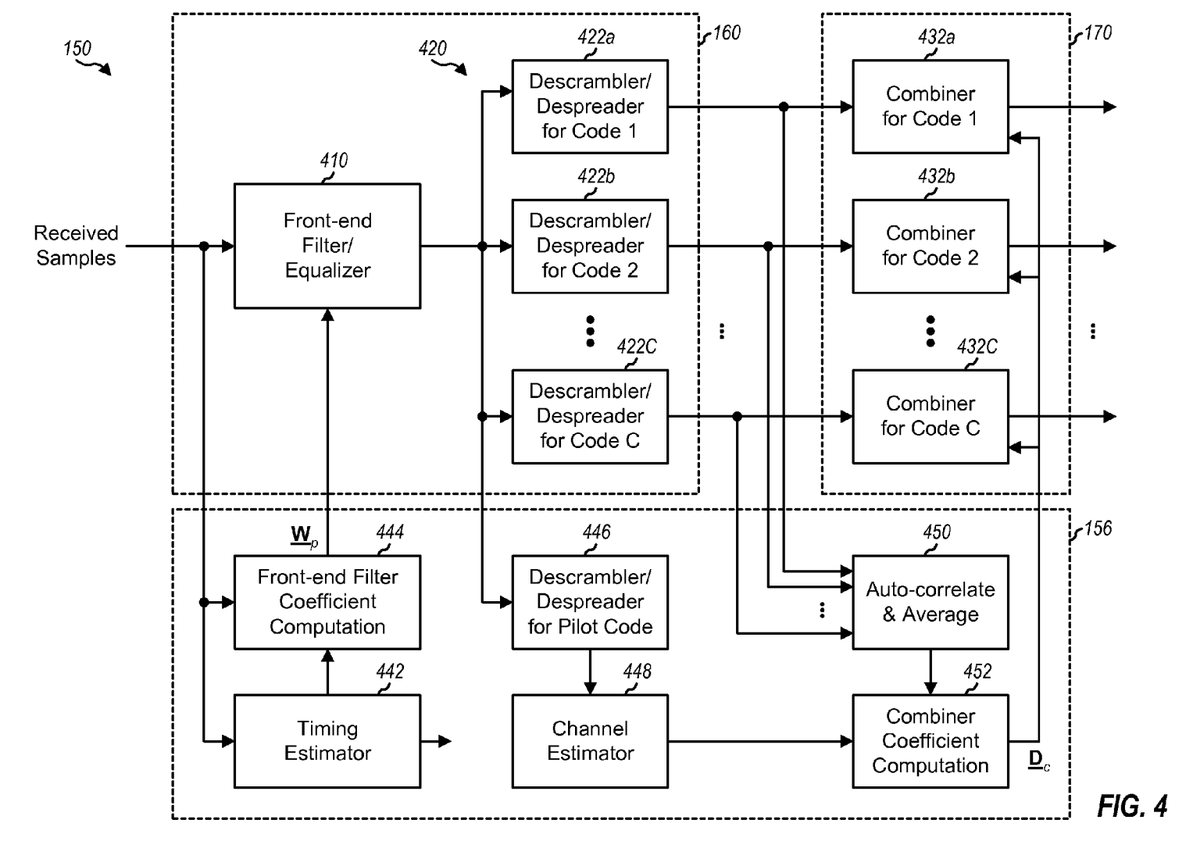
FIG. 4 shows a design of various blocks within the receiver.

FIG. 4 shows a block diagram of a design of various blocks within receiver 150 in FIG. 1. In this design, front-end filtering is performed prior to CDMA demodulation. Block 160 includes a front-end filter/equalizer 410 and a CDMA demodulator 420. Demodulator 420 includes C descramblers/despreaders 422a through 422C for up to C channelization codes used for traffic data. Block 170 includes C combiners 432a through 432C for up to C channelization codes used for traffic data.

Within channel processor 156, a timing estimator 442 determines the timing of the received signals. Unit 442 may estimate channel impulse responses and/or power delay profiles for different antennas and may determine the center of gravity of the channel impulse responses and/or power delay profiles. Unit 442 may then determine the timing of the received signals based on the center of gravity.

A coefficient computation unit 444 derives coefficients for filter $\underline{W}_p$ based on the received samples, e.g., as shown in equation (28). Unit 444 may also derive $\underline{W}_p$ based on RLS, block least squares, or some other technique. The timing information from unit 442 may be used for training, e.g., to align the locally generated pilot chips with the received samples. Unit 444 provides $\underline{W}_p$ to front-end filter 410.

Filter 410 performs front-end filtering/equalization on the received samples x(k) with $\underline{W}_p$ and provides filtered samples. Within demodulator 420, each unit 422 despreads and descrambles the filtered samples for a different channelization code and provides filtered symbols $\underline{z}_c(s)$ for that channelization code.

A unit 446 despreads and descrambles the filtered samples for pilot channelization code p. Units 422 and 446 perform despreading and descrambling based on the timing provided by unit 442. A channel estimator 448 estimates an M×M matrix $\underline{W}_p^H\tilde{\underline{H}}$ based on the filtered pilot symbols from unit 446. A unit 450 computes the outer product $\underline{z}_c(s)\underline{z}_c^H(s)$ for each channelization code, averages the outer product across channelization codes and symbol periods, and provides correlation matrix $\underline{R}_{zz}$, e.g., as shown in equation (46). A unit 452 derives the coefficients for combiner matrix $\underline{D}_c$ for each channelization code c based on matrix $\underline{W}_p^H\tilde{\underline{H}}$ from unit 448, the correlation matrix $\underline{R}_{zz}$ from unit 450, and code-specific matrices, as follows:

$$\underline{D}_c = \underline{R}_{zz}^{-1} \underline{W}_p^H \tilde{\underline{H}} \underline{G}_c \underline{B}_c. \quad \text{Eq (50)}$$

Within RX MIMO processor 170, each combiner 452 combines the filtered symbols for a different channelization code c based on the combiner matrix $\underline{D}_c$ and provides detected symbols for that channelization code.

Receiver 150 may estimate the received signal quality, which may be quantified by a signal-to-interference-and-noise ratio (SINR), etc. The detected symbols from equation (42) may be expressed as:

$$\hat{\underline{b}}_c(s) = \underline{D}_c^H \underline{A}_c \underline{b}_c(s) + \underline{D}_c^H \underline{n}_c(s) \quad \text{Eq (51)}$$
$$= \underline{L}_c^H \underline{b}_c(s) + \underline{w}_c(s)$$

where $\underline{L}_c^H = \underline{D}_c^H \underline{A}_c$ and $\underline{w}_c(s) = \underline{D}_c^H \underline{n}_c(s)$. The covariance of $\underline{n}_c(s)$ may be given as $\underline{R}_{nn,c} = E\{\underline{n}_c(s)\underline{n}_c^H(s)\}$. The covariance of $\underline{w}_c(s)$ may be given $\underline{R}_{ww,c} = \underline{D}_c^H \underline{R}_{nn,c} \underline{D}_c$.

The SINR of the l-th element of $\hat{\underline{b}}_c(s)$, $\hat{b}_{l,c}(s)$, may be expressed as:

$$SINR\{\hat{b}_{l,c}(s)\} = \frac{|L_c(\ell, \ell)|^2}{R_{ww,c}(\ell, \ell) + \sum_{i=1, i\neq \ell}^{L} |L_c(\ell, i)|^2}, \quad \text{Eq (52)}$$

where $L_c(l,l)$ is the (l,l)-th element of $\underline{L}_c$, and $R_{ww,c}(l,l)$ is the (l,l)-th element of $\underline{R}_{ww,c}$.

$\overline{SINR}\{\hat{b}_{l,c}(s)\}$ is the SINR of the l-th data stream sent with channelization code c and may be used to select a data rate for that data stream. The SINR for each channelization code c is dependent on transmit matrix $\underline{B}_c$ used for that channelization code. Receiver 150 may determine the SINR for different possible transmit matrices and select the transmit matrix with the highest SINR. Receiver 150 may send feedback information to transmitter 110. This feedback information may comprise the transmit matrix selected for each channelization code, the SINR or data rate for each channelization code, an average SINR or data rate for all channelization codes, etc.

In general, front-end filtering may be performed in the first stage to process non on-time signal components in the M received signals. The front-end filter is, in general, not dependent on how the signals are processed at the transmitter prior to transmission. For a CDM transmission, the front-end filter may be applicable for all channelization codes. The second stage may combine the on-time signal components to recover the L transmitted signals. The combiner matrices used in the second stage may be dependent on how the signals are processed prior to transmission (e.g., the transmit matrix $\underline{B}_c$ and gain matrix $\underline{G}_c$ used by the transmitter) and other factors (e.g., the channel response $\underline{\hat{H}}$ and signal statistics $\underline{R}_{zz}$).

Figure 5:
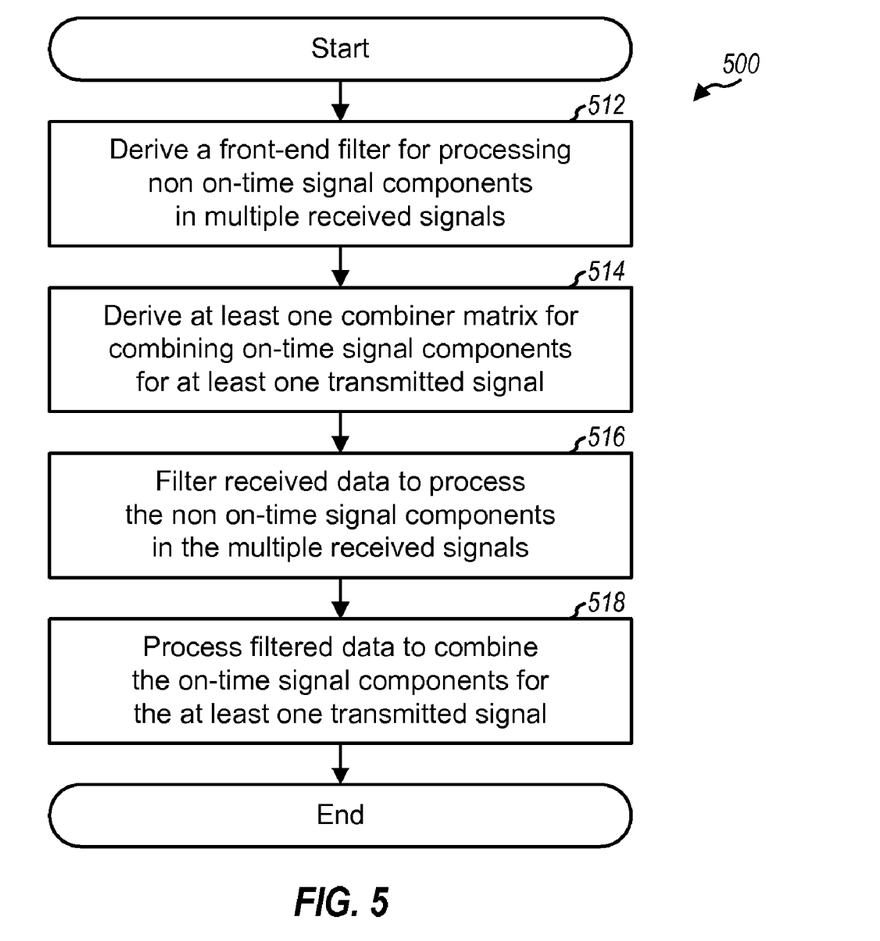
FIG. 5 shows a process for recovering a MIMO transmission at the receiver.

FIG. 5 shows a design of a process 500 for recovering a MIMO transmission at a receiver. A front-end filter for processing (e.g., compensating for, suppressing, or mitigating) non on-time signal components in multiple received signals is derived (block 512). The front-end filter does not isolate the non on-time signal components. Instead, the front-end filter processes the non on-time signal components in a desirable/beneficial manner and may also (incidentally) process on-time signal components. At least one combiner matrix for combining on-time signal components for multiple transmitted signals is also derived (block 514). The front-end filter may be $\underline{F}$ derived as shown in equation (32), and the combiner matrices may be $\underline{\Delta}_c$ derived as shown in equation (33). The front-end filter may also be $\underline{W}_p$ derived as shown in equation (26) or (28), and the combiner matrices may be $\underline{D}_c$ derived, e.g., as shown in equation (43), (47) or (50). The front-end filter and combiner matrices may also be derived in other manners. The front-end filter may be derived based on received data for pilot and in accordance with, e.g., least squares criterion. The combiner matrices may be derived based on the transmit matrices used to send data, the gains used for data, a channel response estimate, the front-end filter, signal and/or noise statistics, etc. The combiner matrices may also be derived in accordance with MMSE or some other criterion.

Received data is filtered to process the non on-time signal components in the multiple received signals (block 516). Filtered data is processed to combine the on-time signal components for the multiple transmitted signals (block 518). Received data for more than one symbol period may be filtered to process the non on-time signal components. Filtered data for one symbol period may be processed to combine the on-time signal components. The received data and filtered data may be given in samples, symbols, etc.

For a CDM transmission sent with multiple channelization codes, a single front-end filter may be derived and used to process the non on-time signal components, and multiple combiner matrices may be derived and used to combine the on-time signal components for the multiple channelization codes. In one scheme, the received data is first filtered with the front-end filter to obtain intermediate data. The intermediate data is then despread for each channelization code to obtain filtered data for the channelization code. The filtered data for each channelization code is further processed with a combiner matrix for that channelization code to obtain output data for the channelization code. In another scheme, the received data is first despread for each channelization code to obtain despread data for the channelization code. The despread data for each channelization code is then filtered with the same front-end filter to obtain filtered data for the channelization code. The filtered data for each channelization code is further processed with a combiner matrix for the channelization code to obtain output data for the channelization code.

For CDM, the front-end filter may be derived based on the received data and known pilot, e.g., based on (a) samples for the received data and known pilot chips for chip level training or (b) despread pilot symbols obtained from the received data and known pilot symbols for symbol level training. The combiner matrices may be derived based on the transmit matrices used for the multiple channelization codes, the gains for the multiple channelization codes, a channel response estimate, the front-end filter, signal and/or noise statistics, etc., or a combination thereof. The front-end filter and channel response estimate may be estimated jointly, e.g., as $\underline{W}_p^H \underline{\hat{H}}$.

The multi-stage receiver may also be used for other communication systems. For example, in a time division multiplexed (TDM) system, a front-end filter may be derived based on pilot received in a first time interval, and a combiner matrix for a second time interval may be derived based on a transmit matrix used in the second time interval. Data received in the second time interval may be filtered with the front-end filter, and the filtered data may be further processed with the combiner matrix.

In general, a filter may be derived based on pilot, which may be sent on a particular channelization code and/or time interval and using a particular transmit matrix and gain. The filter derived from the pilot may be used to derive a filter for data, which may be sent on other channelization codes and/or time intervals and possibly using different transmit matrices and gains.

For CDMA, the on-time and non on-time signal components may be distinguished by the time at which they are transmitted. The receiver may process a window of samples in order to recover a desired symbol transmitted by the transmitter. The timing of the equalizer determines the time instant at which the desired symbol is transmitted relative to the window. The samples obtained by the receiver contain different additive signal components including on-time and non on-time signal components. The on-time signal components are signal components for the desired symbol as well as other symbols transmitted at the same time as the desired symbol. All other signal components are non on-time signal components, which include signal components tracing back to symbols transmitted before and after the desired symbol.

A symbol may be transmitted by a transmit function, which may be dependent on one or more parameters. For example, the transmit function may be dependent on symbol period s, channelization code c, frequency slot or subcarrier index n, etc., and may be denoted as $f(s, c, n, \ldots)$. For simplicity, the transmit function may be dependent on three parameters s, c and n, or a tuple (s, c, n). The transmit functions for different symbols may be orthogonal so that $<f(s_1,c_1,n_1), f(s_2,c_2,n_2)> \neq 0$ only if $s_1=s_2$, $c_1=c_2$ and $n_1=n_2$, which may be expressed as $(s_1,c_1,n_1)=(s_2,c_2,n_2)$.

A received signal may include (a) desired signal components from a desired transmit function $f(s_1,c_1,n_1)$ defined by tuple $(s_1,c_1,n_1)$ and (b) other signal components from other transmit functions $f(s,c,n)$, with $(s,c,n) \neq (s_1,c_1,n_1)$. The front-end filtering in the first stage would process the other signal components. The combiner in the second stage would process the desired signal components.

For CDM, the transmit functions for symbol period s are determined by channelization codes of length C multiplied by scrambling sequence p(k). The transmit function for symbol period s and channelization code c may be denoted as $f(s,c)$. From the perspective of a symbol transmitted with transmit function $f(s_1,c_1)$, the received signal contains the following:
1. non on-time signal components corresponding to $f(s,c)$ for $s \ne s_1$,
2. on-time signal components corresponding to $f(s_1,c)$ and composed of:
   a. on-time signal components from the desired channelization code and corresponding to $f(s_1,c_1)$, and
   b. on-time signal components from other channelization codes and corresponding to $f(s_1,c_2)$ for $c_1 \ne c_2$.

The front-end filter processes the non on-time signal components corresponding to $f(s,c)$. The descrambling and despreading by the front-end filter also cancels the on-time signal components from other channelization codes and corresponding to $f(s_1,c_2)$. The combiner processes the on-time signal components from the desired channelization code and corresponding to $f(s_1,c_1)$.

In a single carrier system that does not utilize CDM, the transmit functions may be simply digital deltas in time and may be given as $f(s)=\delta(t-s)$. As time t advances, the position of the delta changes in time.

In an OFDM-based system, the transmit functions may be for different subcarriers and may be given as $f(s,n)$, where n is a subcarrier index. The subcarriers in OFDM may correspond to the channelization codes in CDM. A transmitter may send N data/pilot symbols on N subcarriers in an OFDM symbol period from a given transmit antenna by (a) converting the N data/pilot symbols to the time-domain with an inverse fast Fourier transform (IFFT) to obtain N time-domain samples and (b) appending a cyclic prefix to the time-domain samples to obtain an OFDM symbol. A receiver may obtain received data/pilot symbols for a given receive antenna by (a) removing the cyclic prefix in the received samples and (b) converting N received samples to the frequency-domain with a fast Fourier transform (FFT) to obtain N received symbols for the N subcarriers. The received symbols may correspond to $z_c(s)$ in equation (40), where subscript c is replaced with subcarrier index n. For OFDM, the on-time signal components may be signal components sent on a particular subcarrier from different transmit antennas. The non on-time signal components may be signal components sent on other subcarriers. The front-end filter may be implemented by the FFT and cyclic prefix removal at the receiver. A combiner matrix $D_c$ may be computed for each subcarrier and used to combine received symbols from all received antennas for that subcarrier.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:
1. An apparatus comprising:
at least one processor including:
   a front-end filter to filter received data to obtain intermediate data;
   a demodulator to despread the intermediate data for each of a plurality of channelization codes to obtain filtered data for each channelization code;
   a set of combiners to process the filtered data with one combiner matrix for each channelization code to obtain output data for each channelization code; and
a memory coupled to the at least one processor to store the intermediate data and filtered data, wherein the at least one processor filters the received data to process non on-time signal components in multiple received signals and processes the filtered data to combine on-time signal components for multiple transmitted signals,
   wherein the at least one processor
derives the coefficients of the front-end filter for processing the non on-time signal components and based on received data for pilot chips and derives the coefficients of the com- biner matrices based on at least one transmit matrix used to send data in the multiple transmitted signals.

2. The apparatus of claim 1, wherein the at least one processor filters the received data for more than one symbol period to process the non on-time signal components, and processes the filtered data for one symbol period to combine the on-time signal components.

3. The apparatus of claim 1, wherein the at least one processor filters the received data in time domain.

4. The apparatus of claim 1, wherein the at least one processor derives the coefficients of a plurality of combiner matrices for combining the on-time signal components for the plurality of channelization codes used for the multiple transmitted signals.

5. The apparatus of claim 4, wherein the at least one processor processes the filtered data with the plurality of combiner matrices to obtain output data for the plurality of channelization codes.

6. The apparatus of claim 4, wherein the at least one processor derives the coefficients of the front-end filter based on the received data and known pilot.

7. The apparatus of claim 4, wherein the at least one processor derives the coefficients of the front-end filter based on samples of the received data and known pilot chips.

8. The apparatus of claim 4, wherein the at least one processor despreads the received data with a pilot channelization code to obtain despread pilot symbols, and derives the coefficients of the front-end filter based on the despread pilot symbols and known pilot symbols.

9. The apparatus of claim 4, wherein the at least one processor derives the coefficients of the front-end filter based on a least squares criterion.

10. The apparatus of claim 4, wherein the at least one processor derives the coefficients of the plurality of combiner matrices based on a plurality of transmit matrices used for the plurality of channelization codes.

11. The apparatus of claim 10, wherein the at least one processor derives the coefficients of the multiple plurality of combiner matrices further based on gains for the plurality of channelization codes.

12. The apparatus of claim 10, wherein the at least one processor derives the coefficients of the plurality of combiner matrices further based on a channel response estimate and the front-end filter.

13. The apparatus of claim 10, wherein the at least one processor derives the coefficients of the plurality of combiner matrices based on a minimum mean square error (MMSE) criterion.

14. The apparatus of claim 4, wherein the at least one processor derives the coefficients of each of the plurality of combiner matrices for each channelization code based on a noise covariance matrix, the front-end filter, a channel response estimate, and a transmit matrix for the channelization code.

15. The apparatus of claim 4, wherein the at least one processor derives the coefficients of each of the plurality of correlation matrices based on the filtered data and derives the coefficients of a combiner matrix for each channelization code based on the correlation matrix, the front-end filter, a channel estimate, and a transmit matrix for the channelization code.

16. The apparatus of claim 4, wherein the at least one processor updates the coefficient of the front-end filter at a first update rate and updates the coefficients of the plurality of combiner matrices at a second update rate different from the first update rate.

17. The apparatus of claim 1, wherein the at least one processor estimates received signal quality for at least one data signal sent in the multiple transmitted signals.

18. An apparatus comprising:
at least one processor including:
a front-end filter to filter received data to obtain intermediate data;
a demodulator to despread the intermediate data for each of a plurality of channelization codes to obtain filtered data for each channelization code;
a set of combiners to process the filtered data with one combiner matrix for each channelization code to obtain output data for each channelization code; and
a memory coupled to the at least one processor to store the intermediate data and filtered data, wherein the at least one processor filters the received data to process non on-time signal components in multiple received signals and processes the filtered data to combine on-time signal components for multiple transmitted signals,
wherein the at least one processor derives the coefficients of a front-end filter based on pilot received in a first time interval, derives the coefficients of a combiner matrix for a second time interval based on a transmit matrix used in the second time interval, filters received data for the second time interval with the front-end filter to obtain filtered data for the second time interval, and processes the filtered data with the combiner matrix.

19. An apparatus comprising:
at least one processor to derive the coefficients of a front-end filter for processing non on-time signal components in multiple received signals, to derive the coefficients of a plurality of combiner matrices for combining on-time signal components for multiple transmitted signals sent with a plurality of channelization codes, to filter received data with the front-end filter and obtain filtered symbols for the plurality of channelization codes, and to process filtered symbols for each of the plurality of channelization codes with a combiner matrix for the channelization code to obtain output symbols for the channelization code, wherein the at least one processor derives the coefficients of the combiner matrix for each channelization code based on a transmit matrix used for the channelization code; and
a memory coupled to the at least one processor.

20. The apparatus of claim 19, wherein the at least one processor derives the coefficients of the front-end filter based on the samples of the received data received samples and known pilot chips.

21. A method comprising:
filtering received data to process non on-time signal components in multiple received signals with a front-end filter to obtain intermediate filtered data;
despreading the intermediate data for each of a plurality of channelization codes to obtain filtered data for each channelization code;
processing the filtered data for each channelization code with at least one combiner matrix for each channelization code to combine on-time signal components for multiple transmitted signals,
deriving the coefficients of the front-end filter for processing the non on-time signal components; and
deriving the coefficients of the plurality of combiner matrices for combining the on-time signal components for the plurality of channelization codes used for the multiple transmitted signals,
wherein the deriving of the coefficients of the multiple combiner matrices comprises deriving a combiner matrix for each of the plurality of channelization codes based on a transmit matrix used for the channelization code.

22. The method of claim 21, wherein the deriving of the coefficients of the front-end filter is based on samples for the received data and known pilot chips.

23. An apparatus comprising:
means for filtering received data to process non on-time signal components in multiple received signals and obtain filtered data, wherein the means for filtering the received data comprises means for filtering the received data with a front-end filter to obtain intermediate data, and means for despreading the intermediate data for each of a plurality of channelization codes to obtain filtered data for each channelization code;
means for processing the filtered data to combine on-time signal components for multiple transmitted signals, wherein the means for processing the filtered data comprises means for processing the filtered data for each channelization code with a combiner matrix for the channelization code to obtain output data for the channelization code;
means for deriving the coefficients of the a front-end filter for processing the non on-time signal components; and
means for deriving the coefficients of the plurality of combiner matrices for combining the on-time signal components for the plurality channelization codes used for the multiple transmitted signals,
wherein the means for deriving
the coefficients of the front-end filter comprises means for deriving the coefficients of the front-end filter based on samples for the received data and known pilot chips, and wherein the means for deriving the coefficients of the plurality of combiner matrices comprises means for deriving the coefficients of a combiner matrix for each of the plurality of channelization codes based on a transmit matrix used for the channelization code.

24. A processor readable medium media for storing instructions operable to:
filter received data to process non on-time signal components in multiple received signals with a front end filter to obtain intermediate data;
despread the intermediate data for each of a plurality of channelization codes to obtain filtered data for each channelization code; and
process the filtered data for each channelization code with at least one combiner matrix for each channelization code to combine on-time signal components for multiple transmitted signals;
derive the coefficients of the front-end filter for processing the non on-time signal components; and
derive the coefficients of the plurality of combiner matrices for combining the on-time signal components for the plurality of channelization codes used for the multiple transmitted signals,
wherein the deriving of the coefficients of the multiple combiner matrices comprises deriving a combiner matrix for each of the plurality of channelization codes based on a transmit matrix used for the channelization code.

* * * * *